United States Patent [19]
Kotera

[11] Patent Number: 4,837,472
[45] Date of Patent: Jun. 6, 1989

[54] INNER MAGNET ROTOR FOR MAGNET PUMP

[75] Inventor: Masayuki Kotera, Mishima, Japan

[73] Assignee: Seikow Chemical Engineering & Machinery, Ltd., Hyogo, Japan

[21] Appl. No.: 151,801

[22] Filed: Feb. 3, 1988

[30] Foreign Application Priority Data

Mar. 3, 1987 [JP] Japan ................................ 31754

[51] Int. Cl.$^4$ ............................................. H02K 21/14
[52] U.S. Cl. ...................................... 310/156; 29/598; 310/42
[58] Field of Search ................... 310/26, 42, 153, 156, 310/261; 29/598; 248/206.5

[56] References Cited

U.S. PATENT DOCUMENTS

| | | | |
|---|---|---|---|
| 4,513,216 | 4/1985 | Müller | 310/156 |
| 4,543,506 | 9/1985 | Kawada et al. | 310/156 |
| 4,639,627 | 1/1987 | Takekoshi et al. | 310/156 |
| 4,746,827 | 5/1988 | Ochiai et al. | 310/261 |

FOREIGN PATENT DOCUMENTS 359671 10/1931 United Kingdom ................ 310/156

Primary Examiner—Patrick R. Salce
Assistant Examiner—D. L. Rebsch
Attorney, Agent, or Firm—Larson and Taylor

[57] ABSTRACT

An inner magnet rotor for a magnet pump includes a yoke, magnets arranged on the yoke, a first holder, affixed to the yoke, for tightly holding the magnets at the front side of the yoke, and a second holder, affixed to the yoke for tightly holding the magnets at the rear side of the yoke. The first and second holders are lower in hardness than the magnets, and the magnets are chamfered at each of their front and rear ends to form a bevel face. Each of the first and second holders are formed with a slanting face opposed to the bevel face, the slanting face of each of the holders being at a smaller angle with respect to the axis of the rotor than the bevel face of each of the magnets before each holder is affixed to the yoke.

7 Claims, 1 Drawing Sheet

INNER MAGNET ROTOR FOR MAGNET PUMP

BACKGROUND OF THE INVENTION

1. Field of the Invention

The present invention relates to an inner magnet rotor for magnet pumps, and more particularly to an inner magnet rotor for use in magnet pumps which includes magnets of different polarities arranged alternately on a yoke to be drivingly connected to the impeller shaft of the pump.

With such inner magnet rotors for magnet pumps, the magnets on the yoke must be firmly supported at their front and rear ends by holders fixed to the front and rear sides of the yoke. It is required that the holders support the magnets both axially and radially of the rotor.

2. Description of the Prior Art

Conventional inner magnet rotors for magnet pumps fulfilling the above requirement include one having the structure of FIG. 5 (which shows a holder, magnet and yoke only partially). With the prior-art rotor, a stepped portion 102 is formed in the edge of one end of the magnet 101 provided on the yoke 100, i.e. in the magnet shoulder portion, and the holder 103 is formed in its inner side, i.e. in its front side, with a stepped portion 104 complementary to the stepped portion 102. Although FIG. 5 shows the support structure only at one end of each magnet, the other end of the magnet is supported by substantially the same structure as the one shown in FIG. 5.

In the case of the rotor of FIG. 5, the holder 103 is fixed to the yoke 100 with fastening screws 105 schematically represented by a dashed line. The stepped portion 104 of the holder 103 is in engagement with the stepped portion 102 of the magnet 101, holding the magnet 101 axially and radially of the rotor.

The projection 106 of the holder stepped portion 104 of the conventional support structure actually has a small wall thickness radially of the rotor. The small thickness renders the holder 103 unable to support the magnet 101 with sufficient strength with respect to the radial direction. To give the support structure sufficient strength in the radial direction, the projection 106 needs to have a correspondingly increased thickness, which then requires a corresponding decrease in the radius of the stepped portion 102 of the magnet 101. Generally, the magnets for magnet pump inner magnet rotors are prepared from those commercially available and having no stepped portion by machining the magnets to form stepped portions, and are assembled with a yoke and holders into the rotor. The decrease in the radius of the magnet stepped portion 102 presents difficulty in machining, for example, in making the stepped portion 102 fittable to the holder stepped portion 104 with proper accuracy, hence an increased cost.

SUMMARY OF THE INVENTION

The main object of the present invention is to provide an inner magnet rotor for a magnet pump wherein magnets can be firmly held to a yoke axially and radially of the rotor by holders attached to the yoke without entailing the problem of increased cost.

The above object of the invention can be fulfilled by an inner magnet rotor for a magnet pump including a yoke to be drivingly connected to the impeller shaft of the magnet pump, magnets of different polarities arranged alternately on the yoke, a first holder for tightly holding the magnets at the front side of the yoke, first fastening means for fixing the first holder to the yoke, a second holder for tightly holding the magnets at the rear side of the yoke, and second fastening means for fixing the second holder to the yoke, the inner magnet rotor being characterized in that the first and second holders are lower than the magnets in hardness, the magnets being chamfered at each of their front and rear ends to form a bevel face, each of the first and second holders being formed with a slanting face opposed to the bevel face, the slanting face of each of the holders being at a smaller angle with the axis of the rotor than the bevel face of each of the magnets before each holder is fixed to the yoke.

DETAILED DESCRIPTION OF THE PREFERRED EMBODIMENT

Figure 1:
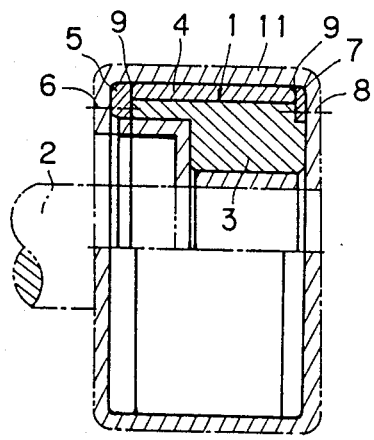
FIG. 1 is a view partly in longitudinal section and showing an embodiment of the invention.
Figure 2:
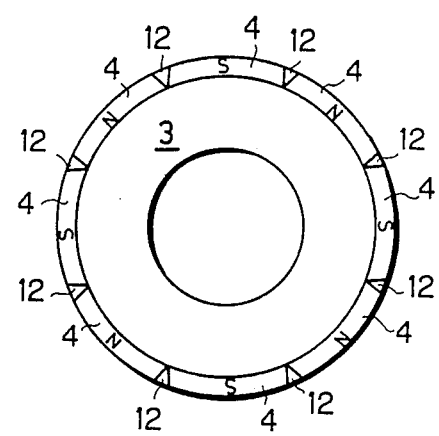
FIG. 2 is a front view showing magnets as arranged on a yoke and included in the rotor of FIG. 1.

Throughout FIGS. 1 to 4, like parts are designated by like reference numerals. With reference to FIG. 1 showing a first embodiment of the invention, the inner magnet rotor of a magnet pump is indicated generally by the reference numeral 1. As shown in FIG. 1, the rotor 1 comprises a yoke 3 to be drivingly connected to the impeller shaft 2 of the magnet pump by a key, screw or the like, and a plurality of magnets 4 arranged on the yoke 3. The magnets 4 of different polarities are arranged alternately as seen in FIG. 2. The rotor 1 further comprises a first holder 5 in the form of a ring of nonmagnetic material for firmly holding the magnets 4 at their front ends, first fastening means 6 comprising fastening screws for firmly fixing the first holder 5 to the front side of the yoke 3, a second holder 7 in the form of a ring of nonmagnetic material for firmly holding the magnets 4 at their rear ends, and second fastening means 8 comprising fastening screws for firmly fixing the second holder 7 to the rear side of the yoke 3. The fastening means 6 and 8 are schematically indicated by dashed lines in FIG. 1.

Rare earth-cobalt magnets, rare earth-iron magnets, ferrite magnets, Alnico magnets, etc. are useful as the magnets 3. Generally, the rare earth-cobalt magnet is about 550 in HV (Vickers hardness), the rare earth-iron magnet about 600 in HV, the ferrite magnet about 530 in HV and the Alnico magnet about 500 in HV.

According to the invention, the first holder 5 and the second holder 7 are made of a material which is lower than the magnets 3 in hardness. Examples of such materials are aluminum, aluminum alloys, copper, copper alloys, zinc, zinc alloys, titanium, titanium alloys, etc. Generally, aluminum and aluminum alloys are about 63 in HB (Brinell hardness), copper and copper alloys about 68 in HB, zinc and zinc alloys about 82 in HB and titanium and titanium alloys about 130 in HV.

Figure 3:
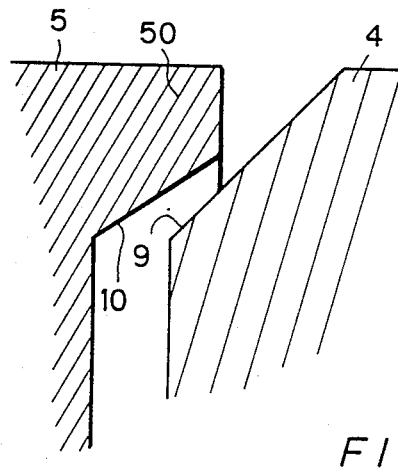
FIG. 3 is an enlarged view showing a bevel face at the chamfered front end of the magnet in the rotor of FIG. 1 and a slanting face formed in a first holder and opposed to the bevel face.

The magnets 4 are chamfered at each of their front and rear ends to form a bevel face 9 as shown in FIG. 3. Although FIG. 3 shows only the chamfer at the front end of the magnet 4 adjacent to the first holder 5, the magnet has substantially the same (symmetrical) chamfer as shown in FIG. 3 also at its rear end.

The first holder 5 and the second holder 7 are formed with slanting faces 10 opposed to the bevel faces 9 at the front and rear ends of the magnets 4. The slanting faces 10 are at a smaller angle with the axis of the rotor 1 than the bevel faces 9 of the magnets 4 before the holders 5 and 7 are fixed to the yoke 3. The angle of the slanting faces 10 is smaller than the corresponding angle of the bevel faces 9 by an angle which is generally about 19 to about 15 degrees although variable over a wide range.

When the first and second holders 5 and 7 are fixed to the front and rear sides of the yoke 3 with the first and second fastening means 6 and 8, respectively, to assemble the rotor 1 shown in FIG. 1, the slanting faces 10, 10 of the first and second holders 5, 7 are engaged with the front and rear bevel faces 9, 9 of the magnets 4 on the yoke 3, supporting the magnets 4 axially and radially of the rotor 1. Thus, the magnets 4 are supported firmly, i.e. tightly, because the first and second holders 5, 7 have the slanting faces 10 with a smaller angle than the bevel faces 9 of the magnets 4 and are lower than the magnets 4 in hardness, such that the slanting faces 10 are slightly collapsed by being tightened up by the first and second fastening means 6, 8 when engaging the bevel faces 9.

Indicated at 11 in FIG. 1 is a corrosion-resistant resin coating formed over the rotor 1 by insert molding. Indicated at 12 in FIG. 2 are spacers.

Figure 4:
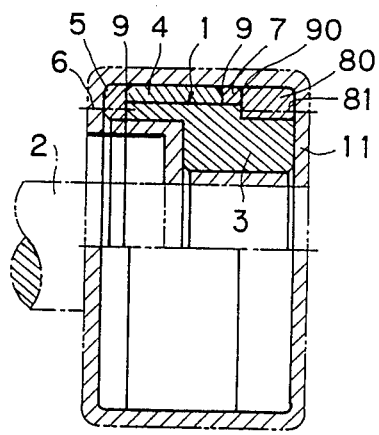
FIG. 4 is a view partly in vertical section and showing a modified embodiment of the invention.
Figure 5:
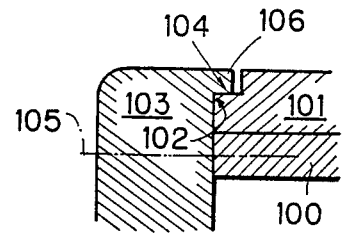
FIG. 5 is a fragmentary view showing the magnet support structure of a conventional rotor.

FIG. 4 shows a modified embodiment of the invention. The rotor 1 shown in FIG. 4 includes magnets 4 of such a short length that the rear ends thereof are positioned slightly beyond the midportion of the yoke 3 toward its rear side. The second fastening means for fixing a second holder 7 is an annular holding member which is made of the same material and has the same hardness as the second holder 7. At the position where the second holder 7 is in contact with the rear ends of the magnets 4, the second holder 7 is fixed to the outer periphery of the yoke 3 by the fastening means. With the exception of these features, the rotor of FIG. 4 has substantially the same construction as the one shown in FIG. 1. The holding member serving as the second fastening means is fixed to the yoke 3 with fastening screws to tightly fasten the second holder 7 from behind. The fastening means for fixing the second holder is indicated at 80, and the fastening screw at 81. The magnets 4 of the rotor of FIG. 4 are firmly supported in the same manner as in the rotor of FIG. 1. With the rotor of FIG. 4, the edge of the rear end face of the second holder 7 and the edge of the front end face of the holding member 80 serving as the second fastening means are preferably formed with respective slanting faces 90 in contact with each other. The slanting faces 90 enable the fastening means 80 to fix the holder 7 effectively.

The rotor 1 shown in FIGS. 1 and 2 is driven by a known outer magnet rotor (not shown) comprising alternately arranged magnets of different polarities.

With the rotor 1 of the invention, the magnets 4 are chamfered at each of their front and rear ends to form a bevel face 9, and each of the first and second holders 5, 7 is formed with a slanting face 10 in engagement with the bevel face 9 opposed thereto, whereby the magnets are tightly fastened to the yoke axially and radially of the rotor. Consequently, the magnets 4 can be tightly held in place as required although the holders 5, 7 can be in engagement with the magnets 4 with much less accuracy than in the prior art. As will be apparent to those skilled in the art, a less dimensional tolerance is allowable in chamfering the magnet 4 is easier than in forming the conventional stepped portion 102 therein. Accordingly, an increased wall thickness can be given at a lower cost to the portion 50 of the first or second holder 5 or 7 which portion corresponds to the conventional holder projection 106.

According to the invention described above, the magnets can be tightly fastened to the yoke axially and radially of the rotor by the holders fixed to the yoke, and this can be realized without entailing the problem of increased cost.

I claim:

1. An inner magnet rotor for a magnet pump including a yoke to be drivingly connected to the impeller shaft of the magnet pump, magnets of different polarities arranged alternately on the yoke, a first, metal holder for tightly holding the magnets at the front side of the yoke, first fastening means for fixing the first holder to the yoke, a second, metal holder, independent of said first holder, for tightly holding the magnets at the rear side of the yoke, and second fastening means for fixing the second holder to the yoke, the inner magnet rotor being characterized in that the first and second holders are lower than the magnets in hardness, the magnets being chamfered at each of their front and rear ends to form a bevel face, each of the first and second holders being formed with a slanting face opposed to the bevel face, the slanting face of each of the holders being at a smaller angle with the axis of the rotor than the bevel face of each of the magnets and the portion of each slanting face in contact with the corresponding bevel face being slightly compressed against that bevel face.

2. An inner magnet rotor as defined in claim 1 wherein the first holder is fixed to the front side of the yoke, and the second holder to the rear side of the yoke.

3. An inner magnet rotor as defined in claim 1 wherein each of the first and second fastening means comprises fastening screws.

4. An inner magnet rotor as defined in claim 1 wherein the first holder is fixed to the front side of the yoke, and the magnets extend over a relatively short distance compared with the axial length of the yoke and have the rear ends thereof positioned slightly beyond the midportion of the axial length of the yoke toward the rear end thereof, the second holder being fixed to the outer periphery of the yoke at a position where the second holder is in contact with the rear ends of the magnets.

5. An inner magnet rotor as defined in claim 4 wherein the first fastening means comprises fastening screws, and the second fastening means comprises a holding member fixed to the yoke and tightly fastening the second holder from behind.

6. An inner magnet rotor as defined in claim 5 wherein the edge of the rear end face of the second holder and the edge of the front end face of the holding member are formed with respective slanting faces in contact with each other.

7. An inner magnet rotor as defined in claim 1 wherein each of the magnets is selected from among a rare earth-cobalt magnet, rare earth-iron magnet, ferrite magnet and Alnico magnet, and the first and second holders are made of a material selected from among aluminum, aluminum alloy, copper, copper alloy, zinc, zinc alloy, titanium and titanium alloy.

* * * * *